United States Patent [19]

von der Heide

[11] Patent Number: 4,556,829
[45] Date of Patent: Dec. 3, 1985

[54] DRIVE ARRANGEMENT FOR SIGNAL PROCESSING EQUIPMENT

[75] Inventor: Johann von der Heide, Schramberg, Fed. Rep. of Germany

[73] Assignee: Papst-Motoren GmbH & Co. K.G., St. Georgen, Fed. Rep. of Germany

[21] Appl. No.: 617,629

[22] Filed: Jun. 6, 1984

[51] Int. Cl.4 ............................................. H02P 6/02
[52] U.S. Cl. .................... 318/254; 318/138; 318/439
[58] Field of Search ............... 318/138, 254 A, 254, 318/439

[56] References Cited

U.S. PATENT DOCUMENTS

| 4,405,885 | 9/1983 | Okamoto | 318/138 X |
| 4,430,603 | 2/1984 | Müller | 318/254 |
| 4,501,997 | 2/1985 | Müller | 318/254 |

FOREIGN PATENT DOCUMENTS

| 52-40718 | 3/1977 | Japan | 318/138 |
| 57-40390 | 3/1982 | Japan | 318/254 |
| 57-49386 | 3/1982 | Japan | 318/254 |

Primary Examiner—William M. Shoop, Jr.
Assistant Examiner—Bentsu Ro
Attorney, Agent, or Firm—Fitch, Even, Tabin & Flannery

[57] ABSTRACT

Drive for signal processing equipment includes a direct drive brushless D.C. motor having a rotor with a permanent magnet formed of at least two pairs of poles and an additional magnet creating a flux discontinuity in the form of a field strength increase, at least one stationary magnetic field sensor, a commutating signal generator stage, a commutating device and a stator winding, and an index signal generator stage that generates one index signal per rotor rotation in response to the flux discontinuity. The commutating signal generator stage is provided with a commutating comparator connected to the magnetic field sensor output, and its two switching points are located close to the portion of the magnetic field sensor output signal not affected by the increased field strength. The index signal generator stage has an index comparator having one switching point located close to the portion of the magnetic field sensor output signal that corresponds to the field strength increase. The index comparator is also connected to the magnetic field sensor. The second switching point of the index comparator at least approximately coincides with the zero crossing of the magnetic field sensor output signal. The output pulse edge of the index comparator that occurs on exceeding the second switching point of the index comparator is taken as an index indicator.

14 Claims, 7 Drawing Figures

Fig. 1
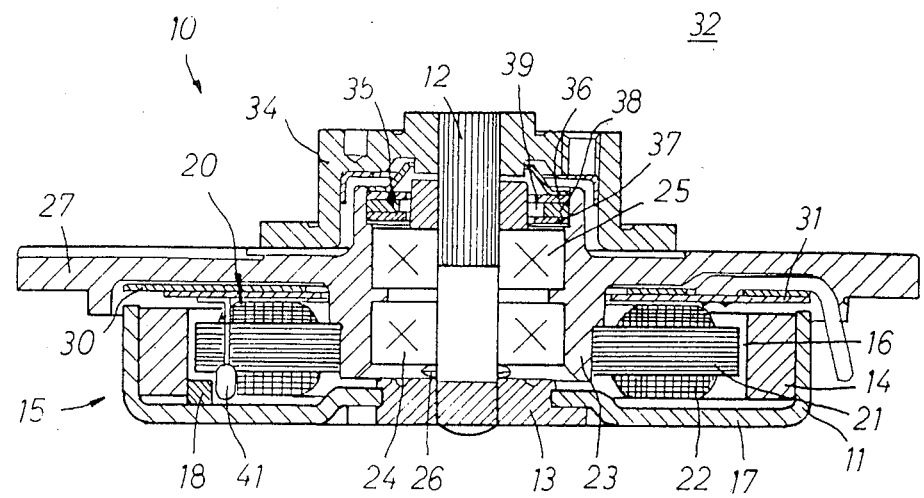
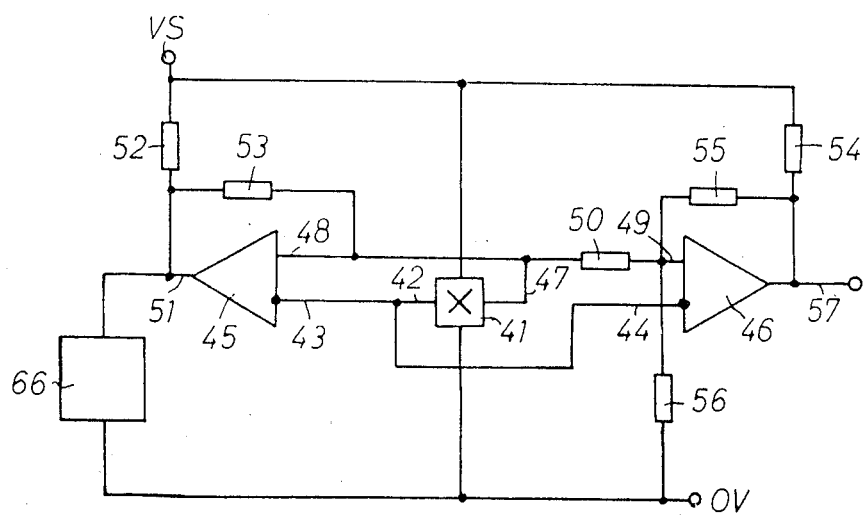
Fig. 2

DRIVE ARRANGEMENT FOR SIGNAL PROCESSING EQUIPMENT

BACKGROUND OF THE INVENTION

1. Field of the Invention

The invention relates to a drive for signal processing equipment, particularly disk storage devices which include a direct drive brushless D.C. motor which has a rotor with a permanent magnet formed of at least two pairs of poles, means providing a field strength increase adjacent one of the magnet poles and causing a flux discontinuity, at least one stationary magnetic field sensor for detecting the rotor position, the sensor having an output signal with a zero position and being located in the field of the permanent magnet, a commutating signal generator stage, a commutating device controlled by the commutating signal generator stage, a stator winding connected electrically to the commutating device, the commutating signal generator stage being provided with a commutating comparator connected to the magnetic field sensor output, the commutating comparator having two switching points close to the portion of the magnetic field sensor output signal which is not affected by the increased field strength, an index signal generator stage which generates one index signal per rotor rotation in response to the flux discontinuity, the index signal generator stage including an index comparator having two switching points, a first of which is close to the portion of the magnetic field sensor output signal which corresponds to the field strength increase.

2. Description of the Prior Art

Such is known from U.S. Pat. No. 4,430,603, whose disclosure is hereby incorporated by reference. In the known arrangement, the precision of the index signal which can be achieved often leaves much to be desired. The term index signal precision is understood to mean that the index signal occurs always precisely when the rotor assumes a predetermined position relative to the stator. In particular in the known solution, changes in the magnetic field amplitude, for example resulting from manufacturing tolerances; the temperature effect of the magnetic field sensor of the index signal generator stage; and wear and tear or similar causes can lead to changes in the index signal so that the index signal no longer precisely coincides with the predetermined position between rotor and stator (hereinafter simply called zero position). This is extremely detrimental, for instance, when using the drive for hard disks where an index signal is required to exactly locate the start of a track.

The invention provides a drive of the aforementioned type which ensures increased precision of the index signal. Another object of the invention is the provision of a simple and inexpensive construction. According to the invention, these problems are solved by also connecting the index comparator to a magnetic field sensor, by having the second switching point of the index comparator coincide at least approximately with the zero position of the magnetic field sensor output signal and by using the output pulse edge or slope of the index comparator, which occurs immediately upon the occurrence of the second switching point of the index comparator, as an index indicator.

SUMMARY OF THE INVENTION

The solution according to the invention uses a single magnetic field sensor which fulfils a dual function by driving both the commutating comparator and the index comparator. The precision of the index signal is increased substantially since the zero position of the magnetic field sensor output signal is almost immune to noise and other disturbing influences, such as changes in the field amplitude. The width of the index signal can be predetermined within wide limits according to the particular requirements by selecting an appropriate distance between the flux discontinuity and the adjacent zero position of the commutating signal.

A Hall generator with differential outputs is particularly suitable as the magnetic field sensor to which the comparators are connected. However, it is fundamentally also possible to consider other magnetic field sensors, for example Hall IC's, field plates, magnetic diodes, etc.

An additional switch arrangement causing an asymmetrical loading of the control inputs of the index comparator can be provided to force the asymmetry of the switching points of the index comparator. Alternatively, an output voltage divider can also be connected to the index comparator output from which output voltage divider a partial voltage is returned as a positive feedback signal to the non-inverting control input of the index comparator.

According to a preferred embodiment of the invention, the commutating comparator is provided with a feedback constructed in such a way that the commutating signal acts on the control input of the index comparator. Thus, the index comparator is influenced by the commutating comparator. The switching points of the commutating comparator can be located exactly on the zero line of the magnetic field sensor output signal, and the two comparators are advantageously coupled so that the commutating comparator is released to act on the index comparator when the index comparator is in the switching position determined by the flux discontinuity. In this case, the index comparator is used essentially only to prepare or set the index signal, whose edge or side, which determines the zero point of the relative position between the rotor and stator, is then determined by the next-following highly accurate zero passage of the commutating signal.

The commutating comparator is appropriately provided with a dynamic feedback from its output to its non-inverting control input. A series connection of a resistor and a capacitor can be provided for this purpose in the feedback branch of the commutating comparator.

When using a Hall generator as a magnetic field sensor, for temperature compensation purposes it can be advantageously supplied from a voltage source whose internal resistance is selected in such a way that the temperature coefficient of the Hall differential output voltage is reduced. The voltage source can simply be a combination of series resistors and a shunt resistor to the supply voltage inputs of the Hall generator and supplied by the supply voltage.

BRIEF DESCRIPTION OF THE DRAWINGS

The invention is described in greater detail hereinafter relative to embodiments and with reference to the attached drawings, wherein:

FIG. 1 is a cross section through a brushless D.C. motor having a permanent magnet external rotor;

FIG. 2 is a circuit for generating commutating and index signals in a motor of the type shown in FIG. 1;

DESCRIPTION OF THE PREFERRED EMBODIMENT(S)

Figure 3:
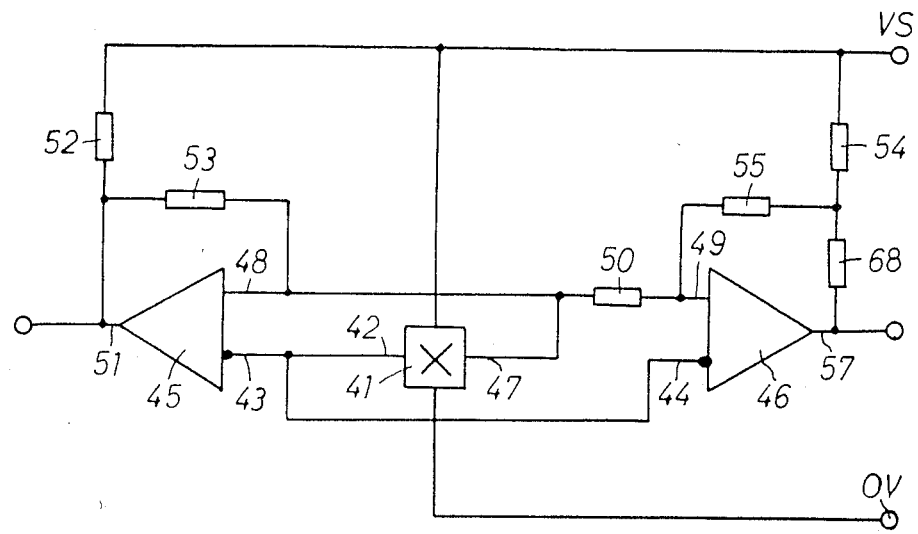
FIG. 3 is a modified embodiment of the circuit for generating commutating and index signals.

FIG. 1 shows an external rotor-type direct drive motor for magnet hard disks constructed as a brushless D.C. motor and designated 10. The motor has a cup-shaped rotor casing 11, which is concentric to a rotor shaft 12 and is fixed thereto by means of a bush 13, which is forced into a central opening of the rotor casing. The rotor casing 11, which is made from a magnetically good conducting material, contains a plurality of permanent magnet pieces or a one-part permanent magnet 14 which, together with the components 11 to 13, forms the rotor 15 of the motor 10. The permanent magnet ring 14 is preferably made from a mixture of hard ferrite, for example barium ferrite and elastic material, or a so-called rubber magnet. It is trapezoidally or approximately trapezoidally magnetized over the pole pitch in instances where the pole clearance is relatively small. For example, it is radially magnetized in quadripolar manner, so that on the inside of the permanent magnet ring 14 facing a cylindrical air gap 16 there are, in alternating sequence, two magnetic north poles and two magnetic south poles, each having a width of approximately 90°. The rotor casing 11 can be produced as a deep-drawn part. It constitutes a magnetic return path. In the corner area formed by a bottom 17 of the rotor casing 11 and the inner periphery of the magnet ring 14, an index magnet 18, being cube-shaped, for example, is secured, such as by a bonding material, into the rotor housing 11, the position being predetermined in reference to the magnetization of the ring 14.

A winding core 21, which is generally in the form of stator plates and carries a stator winding 22, is part of the stator 20 of the motor 10. The winding core 21 is supported on a tubular bearing support part 23, in which the rotor shaft 12 is mounted with the aid of two ball bearings 24, 25, whose facing faces are supported on corresponding shoulders of the part 23. A cup spring 26 engages the bottom of the inner ring of ball bearing 24 and the face of the bush 13 facing the ball bearing so that the ball bearings are axially braced against one another. The bearing support part 23, together with a mounting flange 27, forms a one-piece die casting. Alternatively, the bearing support part can also be force-fitted into a hub connected to the mounting flange or it can be joined in some other way, for example by soldering. The magnet ring 14 and the winding core 21 define the air gap 16.

On the bottom of the mounting flange 27 is a shielding plate 30 made from magnetically good conducting material and a printed circuit board 31. In conjunction with the rotor casing 11 and the ball bearing 25, the shielding plate 30 prevents the escape of magnetic stray flux into the space 32 taken up by the hard storage disks. The drive electronics and optionally a speed regulating circuit, not shown, are located on the printed circuit board 31.

The mounting flange 27 makes it possible to fit the motor 10 to a partition of a hard disk storage compartment which in known manner separates a space 32 from the remainder of the interior of the equipment. A hub 34, which receives one or more hard storage disks, is fixed to the upper end of rotor shaft 12 in FIG. 1. In order to seal the bearing system of the rotor shaft 12 from the storage disk reception space 32, a magnetic fluid packing 35 is placed in the bearing support part 23 in the area between the hub 34 and the bearing 25. The packing 35 includes two pole pieces 36, 37, a permanent magnet ring 38 between the pole pieces, and a magnetic fluid which is introduced into an annular clearance 39 between the magnet ring 38 and the rotor shaft 12.

A magnetic field sensor 41, which can be a Hall generator, is also supported by the printed circuit board 31. It is located in the magnetic field produced by the permanent magnet ring 14 and the index magnet 18 and at a limited distance from the bottom 17 of the rotor casing 11.

In accordance with FIG. 2, one output 42 of sensor 41 is directly connected to the inverting inputs 43, 44 of a commutating comparator 45 and an index comparator 46, respectively. The other output 47 of the sensor 41, which is complementary or oppositely poled with respect to the output 42, is directly connected to the non-inverting input 48 of the commutating comparator 45 and to the non-inverting input 49 of the index comparator 46 across a series resistor 50. A resistor 52 is positioned between an output 51 of the commutating comparator 45 and the positive supply voltage terminal VS. The output 51 of the comparator 45 is connected to this non-inverting input 48 across a feedback resistor 53. A series connection of resistors 54, 55 and 56 is positioned between terminal VS and the other supply voltage terminal 0V. The junction of the resistors 54 and 55 is connected to the output 57 of the index comparator 46, and the junction of the resistors 55 and 56 is connected to input 49 of the comparator 46.

Figure 4:
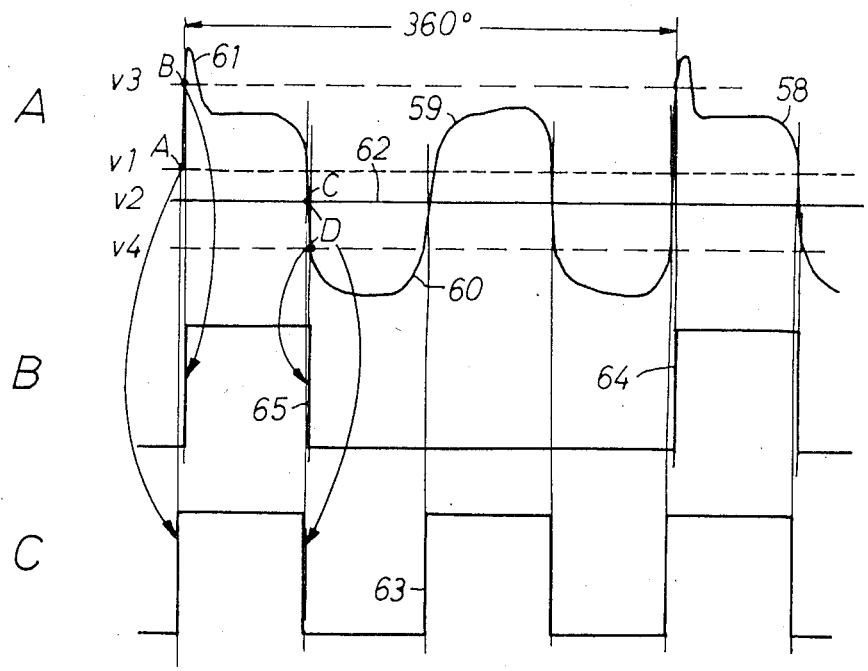
FIG. 4 illustrates signals occurring in the circuits according to FIGS. 2 and 3.

Between the outputs 42 and 47 of the sensor 41, an output signal 58 shown in FIG. 4A appears during every 360° rotation of the rotor 15. Because of the quadripolar radial magnetization of the permanent magnet ring 14, the signal 58 has two positive and two negative portions 59, 60 alternating therewith, each having a width of 90° for each 360° cycle. For example, the portions 59 correspond to the passage of the south poles of the magnet ring 14 at the sensor 41, and the portions 60 correspond to the passage of the north poles of the magnet ring 14 at the magnetic field sensor 41. When the index magnet 18 moves past the sensor 41, it brings about a flux discontinuity in the form of a field strength increase. Thus, there is a protuberance in the output signal 58, as intimated at 61 in FIG. 4A. This protuberance 61 only appears once during each complete rotation of the rotor 15. The resistors 52 and 53 are selected in such a way that the commutating comparator 45 has a hysteresis such that its two switching points are at A and C in FIG. 4A. This means that if the output signal 58 exceeds the upper threshold voltage V1 corresponding to one switching point A, the output 51 of the comparator 45 switches to "high". If the output signal 58 drops below the lower threshold voltage V2 of the comparator 45 corresponding to the switching point C and substantially coinciding with the zero lline 62, the comparator output 51 switches to "low".

The asymmetrical loading of the control inputs of the index comparator 46 by the resistors 50, 54, 55 and 56 forces a pronounced asymmetry of the switching points B, D (FIG. 4A) of the comparator 46. The circuit design is such that the upper threshold voltage V3 corresponding to the switching point B is near the height of protuberance 61, that is higher than the maximum amplitude of the portions 59. However, the lower threshold voltage V4, corresponding to the second switching point D of the comparator 46, is below the zero line 62, but it is still in an area of high steepness of the slope of the output signal 58. Thus, the commutating signal 63 shown in FIG. 4C appears at the output 51 of the commutating comparator 45, and an index signal 64 according to FIG. 4B appears at the output 57 of the index comparator 46. The negative slope or edge 65 of the index signal 64 is evaluated or taken as an index indicator, that is, as an indication for the zero position of the rotor 15 with respect to the stator 20. The position of the edge 65 is largely independent of changes to the amplitude of the sensor output signal 58, which can be caused by temperature changes, changes in the operating voltage, spacing changes between the index magnet 18 and the magnetic field sensor 41, as well as by ageing phenomena.

The commutating signal passes to a commutating device 66, which is diagrammatically indicated in FIG. 2 and which can be constructed in a known manner and which cyclically supplies current to the coils of the stator winding 22, in response to the commutating signal 63.

FIG. 3 shows a modified circuit which differs from that of FIG. 2 in that the resistor 56 is not included and there is an additional resistor 68 between the junction of the resistors 54, 55 and the output 57 of the index comparator 46. The resistors 54, 68 form an output voltage divider from which an output partial voltage is returned across the resistor 55 to the non-inverting control input 49 of the index comparator 46 as a positive feedback signal for forcing the asymmetry of the switching points B and D of the index comparator 46. The operation of the circuit shown in FIG. 3 substantially corresponds with that of FIG. 2 and illustrated relative to FIG. 4.

Figure 5:
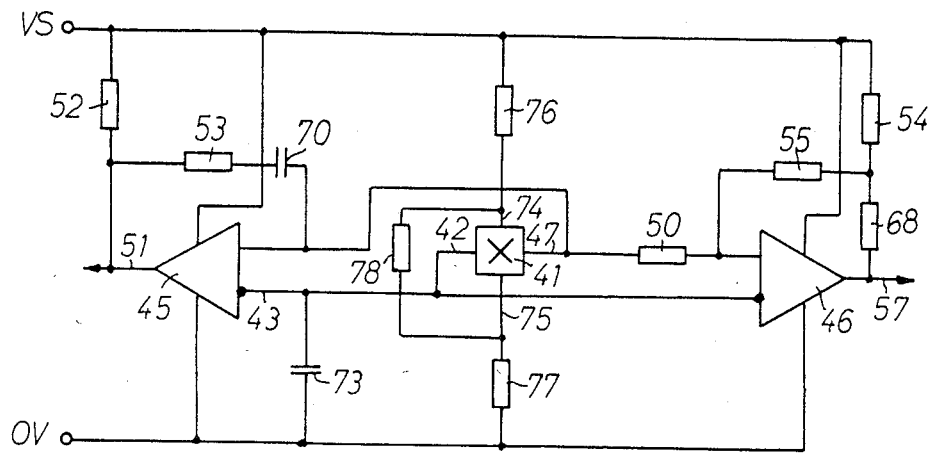
FIGS. 5 and 6 illustrate further modified embodiments of the circuit for generating commutating and index signals.
Figure 7:
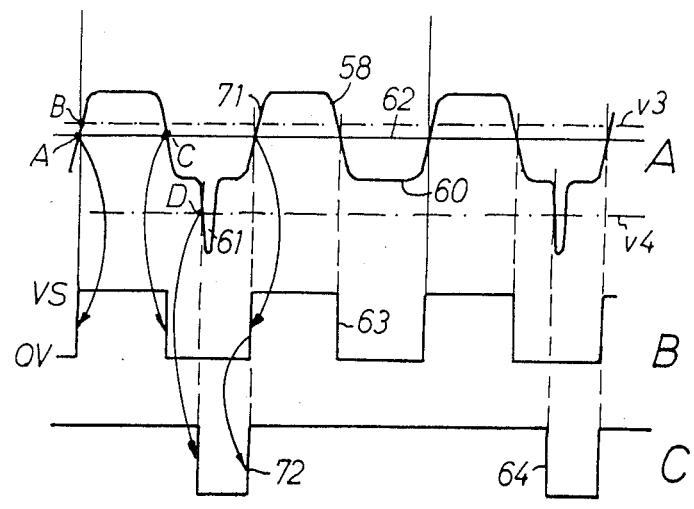
FIG. 7 illustrates signals occurring in the circuits according to FIGS. 5 and 6.

In a further embodiment shown in FIG. 5, a capacitor 70 and a resistor 53 are additionally connected in series in the feedback branch of the commutating comparator 45. Unlike in the solutions of FIGS. 2 and 3, the index magnet 18 is positioned in the vicinity of one of the two north poles of the permanent magnet ring 14. Thus, and as shown in FIG. 7A, a field strength increase (flux discontinuity) is brought about in such a way that the protuberance 61 is associated with one of the negative portions 60 of the output signal 58. There is a dynamic feedback across the resistor 53 and the capacitor 70 for the commutating comparator 45. The switching points A and C of the commutating comparator 45 are located directly on the zero line 62 of the magnetic field sensor output signal 58. The resistors 54, 55 and 68 are selected in such a way that the switching points B and D are positioned in the manner indicated by the dot-dash lines in FIG. 7A. This means that the upper threshold voltage V3 is somewhat above the zero line 62, while the lower threshold voltage V4 is below the maximum negative amplitude of the output signal 58 caused by the magnet ring 14 in the vicinity of the protuberance 61. However, in the circuit of FIG. 5, a strong coupling between the two comparators 45 and 46 is ensured in such a way that following switching of the index comparator 46 at the switching point D, the comparator is made to flip back by the following positive edge 71 of the output signal 58 as soon as this edge has crossed the zero line 62. As a result of this zero passage of the signal 58, the commutating comparator 45 is switched and, because of the coupling of the two comparators, causes the index comparator 46 to respond at the point corresponding to the switching point A and coinciding with the zero position of the signal 58 (instead of at the switching point B). In other words, the index comparator 46 is set by the flux discontinuity (protuberance 61). If the commutating comparator 45 now switches during the next zero passage of the signal 58, it also switches the index comparator 46 because of the close coupling between these two comparators caused by the dynamic feedback. The positive edge 72 appearing at the output 57 thus precisely coincides with the zero passage of the output signal 58. This is more precise than the solutions according to FIGS. 2 and 3. With a time of 16,000 μs for a complete rotation of the rotor 15, using the circuit of FIG. 5, it is possible to achieve a width of the index indication of approximately 8 μs.

A capacitor 73 is positioned between the inverting input 43 of the comparator 45 and the terminal OV. The capacitor prevents an oscillation of the comparator 45 during the transition phases of the output 51.

Resistors 76, 77 are arranged in series with the supply voltage terminals 74, 75 of the magnetic field sensor 41, a resistor 78 being connected across (shunting) the sensor. The resistors 76, 77 and 78 are selected in such a way that a reduction of the temperature coefficient of the Hall differential output voltage occurring at the outputs 42 and 47 is achieved. This ensures a particularly reliable detection of the protuberance 61.

Figure 6:
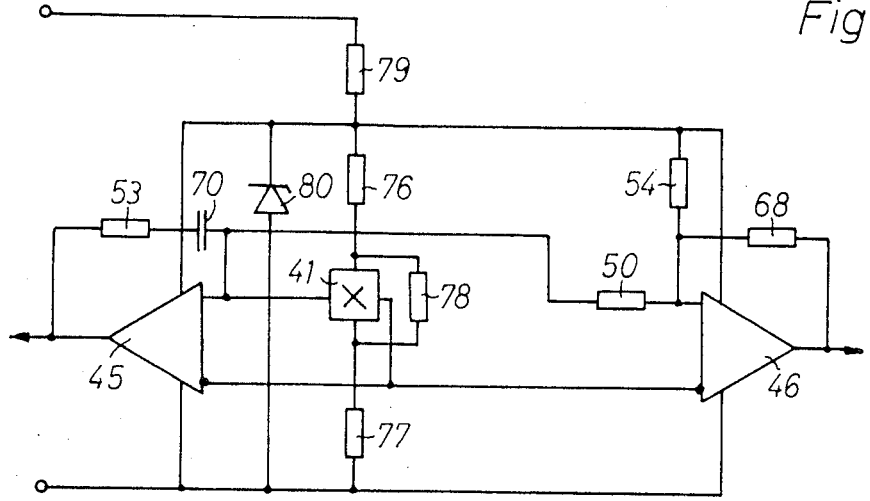

The circuit design according to FIG. 6 substantially corresponds to that of FIG. 5. In FIG. 6, the input voltage is supplied across a series resistor 79 with which a Zener diode 80 is connected in series. This ensures supply voltage stabilization.

It is a common feature of all the illustrated embodiments that they only require a single magnetic field sensor for obtaining the commutating and index signals. The magnetic field sensor supplies the output signal 58 down to lowest speeds. There are also no problems with respect to radio interference.

The assembled structure of the index magnet 18 and the magnetic field sensor 41 cooperating with the permanent magnet ring 14 and the index magnet, accompanied by the formation of a radial air gap illustrated in FIG. 1, offers special advantages, in that the magnetic field sensor 41 is effectively exposed to the flux of the magnets 14, 18, but is only influenced to a minimum extent by the stray flux of the stator winding 22 which occurs with a different approach angle. The rotor 15 can be mounted on the stator 20 or removed therefrom without the index magnet 18 being in the way. The axial overall height of the motor 10 is particularly small. It is understood that the presently disclosed manner of mounting the index magnet and the magnetic field sensor is not restricted to a specific construction of the commutating and/or index signal generator stage.

What is claimed is:

1. Drive for signal processing equipment, particularly disk storage devices, comprising a direct drive brushless D.C. motor having a rotor with a permanent magnet formed of at least two pairs of poles, means providing a field strength increase adjacent one of the magnet poles and causing a flux discontinuity, at least one stationary magnetic field sensor for detection of rotor position, said sensor having an output signal with a zero position, said sensor being located in the field of the permanent magnet, a commutating signal generator stage, a commutating device controlled by the commutating signal generator stage, a stator winding electrically connected to the commutating device, the commutating signal generator stage being provided with a commutating comparator connected to the magnetic field sensor output, the commutating comparator having two switching points located close to the portion of the magnetic field sensor output signal that is not affected by the increased field strength, an index signal generator stage that generates one index signal per rotor rotation in response to the flux discontinuity, the index signal generator stage including an index comparator having first and second switching points, the first of which is close to the portion of the magnetic field sensor output signal that corresponds to the field strength increase, the index comparator being also connected to the magnetic field sensor, the second switching point of the index comparator at least approximately coinciding with the zero crossing of the magnetic field sensor output signal, and the output pulse edge of the index comparator that occurs on exceeding the second switching point of the index comparator being taken as an index indicator.

2. Drive according to claim 1, wherein the magnetic field sensor is a Hall generator with differential outputs to which the inputs of the comparators are connected.

3. Drive according to claim 1, wherein there is an asymmetrical loading of the control inputs of the index comparator via additional circuitry to force the asymmetry of the switching points of the index comparator.

4. Drive according to claim 1, wherein an output voltage divider is connected to the index comparator output for forcing the asymmetry of the switching points of the index comparator and from said divider an output partial voltage is returned to the non-inverting control input of the index comparator as a positive feedback signal.

5. Drive according to claim 1, wherein the commutating comparator is provided with a feedback constructed in such a way that the commutating signal acts on the control input of the index comparator.

6. Drive according to claim 5, wherein the switching points of the commutating comparator are precisely located on the zero line of the magnetic field sensor output signal.

7. Drive according to claim 5, wherein the two comparators are coupled in such a way that the commutating comparator is released for acting on the index comparator when the index comparator is in the switching position brought about by the field discontinuity.

8. Drive according to claim 1, wherein the commutating comparator is provided with a dynamic feedback from its output to its non-inverting control input.

9. Drive according to claim 8, wherein a series connection of a resistor and a capacitor is located in the feedback branch of the commutating comparator.

10. Drive according to claim 2, wherein for temperature compensation purposes the Hall generator is supplied from a voltage source whose internal resistance is selected in such a way that the temperature coefficient of the Hall differential output voltage is reduced.

11. Drive according to claim 10, wherein the voltage source includes a combination of series resistors and a shunt resistor to the Hall generator connected to a supply voltage source.

12. Circuit for generating a commutating signal and an index signal occurring once per rotor rotation in a drive for a signal processing means including a direct drive brushless D.C. motor having a rotor with a permanent magnet formed of at least two pairs of poles, comprising means providing a field strength increase adjacent one of the magnet poles and causing a flux discontinuity, a stationary magnetic field sensor for detecting the rotor position, said sensor having an output signal with a zero position, said sensor being located in the field of the permanent magnet, a commutating device subject to the action of the commutating signal, a stator winding electrically connected to the commutating device, the circuit also including a commutating signal generator stage and an index signal generator stage provided with a commutating comparator and an index comparator, respectively, both comparators being connected to the output of the magnetic field sensor, the commutating comparator having two switching points located near the magnetic field sensor output signal in a portion of the signal not affected by the increased field strength, the index comparator having a first switching point near the portion of the magnetic field sensor output signal that corresponds to the field strength increase and a second switching point which at least approximately corresponds with the zero crossing of the magnetic field sensor output signal, the output pulse edge of the index comparator that occurs on exceeding the second switching point of the index comparator being taken as an index indicator.

13. Drive for signal processing equipment with a direct drive brushless external rotor-type D.C. motor having a rotor with a permanent magnet, the rotor including a casing having an open end and a closed bottom end, comprising stationary magnetic field sensor means located in the field of the permanent magnet and detecting the rotor position, a commutating signal generator stage influenced by the magnetic field sensor means, a commutating signal generator stage, a commutating device controlled by the commutating signal generator stage, a stator winding connected electrically to the commutating device, an index signal generator stage connected to and controlled by the magnetic field sensor means and generating one index signal per rotor rotation, the permanent magnet having an annular exciting magnet forming at least two pairs of poles and an index magnet located adjacent one of the magnet poles of the exciting magnet and which within part of the pole side of one magnet pole of the exciting magnet causes a field strength increase, the exciting magnet being arranged in a cup-shaped rotor casing and the index magnet being located on the bottom of the rotor casing and on the inner circumference of the exciting magnet, the magnetic field sensor means having at least one magnetic field sensor facing the permanent magnet with a radial air gap.

14. Drive according to claim 13, wherein the magnetic field sensor is fixed to a printed circuit board positioned adjacent the open end of the rotor casing.

* * * * *